L. F. VERAIN.
ILLUMINATING DEVICE.
APPLICATION FILED MAR. 30, 1921.
1,403,139.
Patented Jan. 10, 1922.
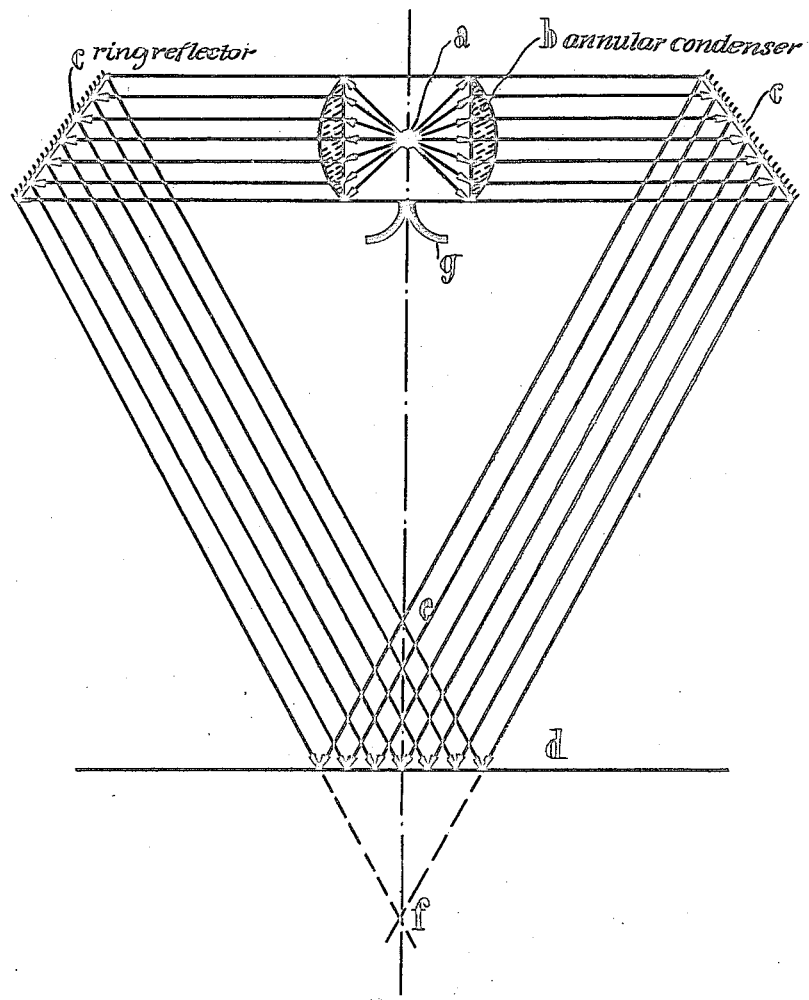
INVENTOR
Louis François Verain
BY
ATTORNEY

UNITED STATES PATENT OFFICE.

LOUIS FRANÇOIS VERAIN, OF ALGIERS, ALGERIA.

ILLUMINATING DEVICE.

1,403,139.  Specification of Letters Patent.  Patented Jan. 10, 1922.

Application filed March 30, 1921. Serial No. 456,970.

(GRANTED UNDER THE PROVISIONS OF THE ACT OF MARCH 3, 1921, 41 STAT. L., 1313.)

*To all whom it may concern:*

Be it known that I, LOUIS FRANÇOIS VERAIN, a citizen of the Republic of France, and resident at Algiers, Algeria, (post-office address, professeur à la Faculté des Sciences,) have invented new and useful Improvements in or Relating to Illuminating Devices, (for which I have filed application in France Sept. 6, 1919, Patent No. 512,192,) of which the following is a specification.

This invention relates to apparatus for intensive illumination, to be used in connection with surgical operating tables, draughtsmen's tables, metal chaser's and engraver's benches, and generally is applicable in operations requiring an intense illumination and in which shadows cast by the head, hands or instruments of the operator or his assistants must be avoided.

It is a feature of this invention that only a single source of light need be used and that the light emitted is collected and transmitted to the surface to be illuminated as if it emanated from a large number of sources of light arranged in a ring or otherwise around the source of light and at a fair distance therefrom.

A construction according to this invention is illustrated in the accompanying drawing. The arrangement is shown in vertical section and may be modified in various ways.

Any desired but preferably compact source of light $a$ is arranged in the center of an annular condenser $b$ so that the principal focus is at $a$. The light issuing from the source $a$ is transformed by the condenser into a horizontal zone of light reflected by a conical mirror $c$ (arranged around the common axis of the device) in a conical zone of light.

The object $d$ to be illuminated is preferably placed near the narrowest portion of the luminous cone, since the centre is not illuminated above the point $e$ or below the point $f$. Between these points the maximum illumination is in the centre. As the rays strike the surface from all angles, the arrangement is most suitable for illuminating without shadows objects which have projections or cavities, and the head of the operator may be right above the said object without the intensity of illumination being perceptably reduced. The path of the light being localized in space, the operator is not liable to be dazzled by light coming directly from the lamp. Moreover, if an object is placed in part of the cone of light, the object still receives light from the rest of the cone and is not in shadow.

One of the advantages of this arrangement is to collect almost the whole of the luminous emission and convey it to the object $d$. Obviously the condenser $b$ may be completed or entirely replaced by a mirror such as $g$ located on the main axis, or by any optical device adapted to transform most of the light emitted by the source into a luminous beam, provided the section of the latter near the reflecting surface is not excessive in size. The above conditions may be fulfilled without the use of a condenser, particularly with sources of light emitting almost the whole of their light in a small solid angle.

A portion of the luminous beam may be used for illuminating the object $d$ or for secondary purposes such as illuminating the room, etc. Moreover the light which does not strike the condenser may be used for illuminating the object either directly or through a suitable optical contrivance. The reflecting surface $c$ may also be replaced by a plurality of flat mirrors. Furthermore the curvature of the mirror in planes containing the axis of revolution may be varied to produce any desired distribution of light on the surface, or even to cause a symmetrical distribution either by varying the curvature as above or by varying the curvature in planes transverse to the axis of revolution.

The terms "vertical" and "horizontal" are used for the sake of clearness, but the device may obviously be inclined or even reversed according to requirements.

Having now particularly described and ascertained the nature of my said invention and in what manner the same is to be performed, I declare that what I claim is:—

1. An illuminating device of the character described, comprising a source of light; an annular condenser encircling the source of light for collecting the rays emitted therefrom and transforming them into a horizontal zone of light; and reflecting means arranged in the form of a ring which encircles the condenser and against which said light zone impinges radially in all directions, said reflecting means directing the light vertically in a conical beam toward the object to be illuminated.

2. An illuminating device of the character described, comprising a source of light; an annular condenser encircling the source of light for collecting the rays emitted therefrom and transforming them into a horizontal zone of light; and a frusto-conical mirror encircling the condenser and against which said light zone impinges radially in all directions, said mirror reflecting the light vertically in a conical beam toward the object to be illuminated.

In testimony whereof I have signed this specification.

LOUIS FRANÇOIS VERAIN.
GEORGES PASCAL CARRIÈRE.